US010355473B2

(12) United States Patent
Law et al.

(10) Patent No.: US 10,355,473 B2
(45) Date of Patent: Jul. 16, 2019

(54) POWER SAFETY DEVICES AND DEVICES AND APPLIANCES COMPRISING SAME

(71) Applicant: ETON SOLUTIONS LIMITED, Hong Kong (CN)

(72) Inventors: Man Yau Law, Hong Kong (CN); Hin Hung Ng, Hong Kong (CN)

(73) Assignee: ETON SOLUTIONS LIMITED, Hong Kong (CN)

( * ) Notice: Subject to any disclaimer, the term of this patent is extended or adjusted under 35 U.S.C. 154(b) by 0 days.

(21) Appl. No.: 15/570,658

(22) PCT Filed: Apr. 29, 2016

(86) PCT No.: PCT/IB2016/052434
§ 371 (c)(1),
(2) Date: Oct. 30, 2017

(87) PCT Pub. No.: WO2016/174622
PCT Pub. Date: Nov. 3, 2016

(65) Prior Publication Data
US 2018/0294639 A1    Oct. 11, 2018

(30) Foreign Application Priority Data

Apr. 30, 2015  (HK) .................................. 15104207
Dec. 11, 2015  (HK) .................................. 15112257

(51) Int. Cl.
*H02H 5/12*    (2006.01)
*H02H 11/00*   (2006.01)
(52) U.S. Cl.
CPC .............. *H02H 5/12* (2013.01); *H02H 11/00* (2013.01)
(58) Field of Classification Search
CPC .................................. H02H 5/12; H02H 11/00
See application file for complete search history.

(56) References Cited

U.S. PATENT DOCUMENTS

| 5,003,486 A | * | 3/1991 | Hendel | ................. | H01R 13/44 324/525 |
| 2018/0152015 A1 | * | 5/2018 | Cheng | ..................... | H02H 5/12 |

FOREIGN PATENT DOCUMENTS

| CN | 103999308 | 8/2014 |
| DE | 3836275 A1 | 4/1990 |

(Continued)

OTHER PUBLICATIONS

International Search Report for PCT/IB2016/052434 dated Sep. 8, 2016.

(Continued)

*Primary Examiner* — Robert L Deberadinis
(74) *Attorney, Agent, or Firm* — Nixon Peabody LLP; Jeffrey L. Costellia

(57) ABSTRACT

A power safety device comprising a controller, a load monitor and switching circuitry, wherein the switching circuitry is operable in a first operation state in which a power supply side and a load side are connected by a lower impedance power conduction path or a second operation state when impedance between the load side and the power supply side is high so that hazardous operation current is prevented from flowing from the power source side, through the switching circuitry, and to the load side, wherein the load monitor comprises circuit arrangements to determine and/or monitor load condition on the load side and the controller is to operate the switching circuitry to operate in the first operation state upon detection of a non-hazardous load condition or a predetermined safe load condition on the load side.

20 Claims, 10 Drawing Sheets

(56) References Cited

FOREIGN PATENT DOCUMENTS

| EP | 1 357 386 A2 | 10/2003 |
| EP | 1357386 | 10/2003 |
| EP | 2 795 755 A1 | 10/2014 |
| KR | 100406847 B1 | 11/2003 |
| WO | WO-2013-092066 | 6/2013 |

OTHER PUBLICATIONS

European Extended Search Report dated Apr. 19, 2018 issued in European Patent application No. 16786051.9.

Abdellah Ouazani et al., article "The Electric Impedance of the Human Body", Oct. 7, 2013 (Oct. 7, 2013), XP055464494, $4^{th}$ International Conference on Electrical, Electronics and Civil Engineering (ICEECE '2013), Oct. 6-7, Dubai (UAE), Available at http://psrcentre.org/images/extraimages/7%201013005.pdf [retrieved on Apr. 4, 2018].

* cited by examiner

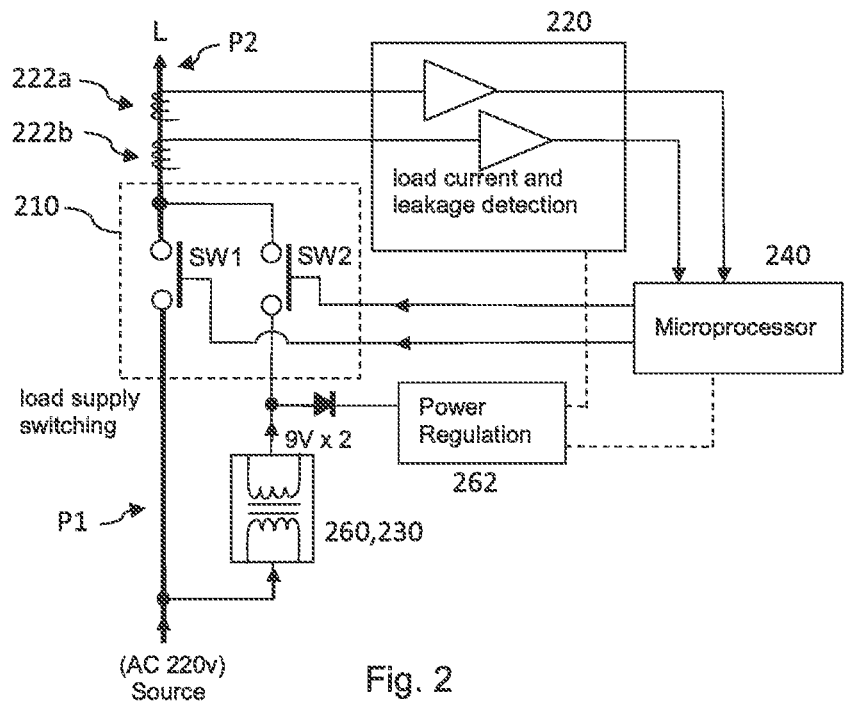
Fig. 2
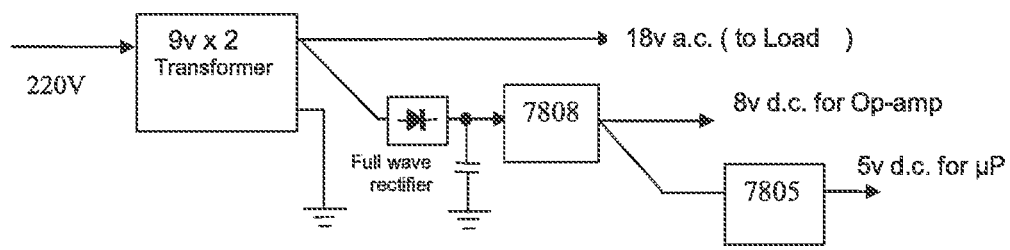
Fig. 2A
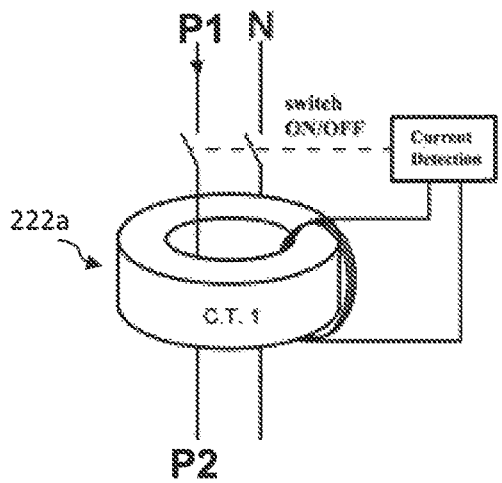
Fig. 2B1
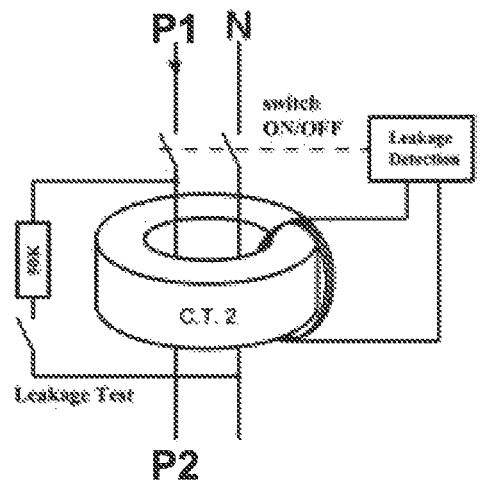
Fig. 2B2

POWER SAFETY DEVICES AND DEVICES AND APPLIANCES COMPRISING SAME

FIELD

The present disclosure relates to power control arrangements, and more particularly to power safety devices for controlling power supply safety. The present disclosure also relates to powered appliances and powered systems comprising power supply safety management devices.

BACKGROUND

Electricity is present and used almost everywhere in modern life. However, the flow of electrical current exceeding a threshold level through the human body can cause electrical shock. Electrical shock can be hazardous and known adverse consequences of electrical shock on the human body include the causing of ventricular fibrillation, respiratory arrest, nerve damage, asphyxia, and burns. Ventricular fibrillation is known to be a main cause of fatal accidents by electrical shock in mains power supply environment.

A person is able to feel the flow of current when the current flowing through the human body reaches a "perception threshold". The typical perceptible threshold for an average human body is about 1 mA at the typical mains frequency of 50 Hz or 60 Hz.

When the current flowing through the human body reaches a "let go threshold", the current flow can cause involuntary muscle contraction or tetany. When this happens, an affected person would not be able to voluntarily control muscles to release grip on a dangerously electrified object and this can result in prolonged contact with the electrified object. A prolonged exposure to a shock current at or around the let-go threshold can cause bodily damage. The typical "let go threshold" for women is between 5 mA and 7 mA and between 7 mA and 10 mA for men. For a person of 68-Kg (150-lb) weight, a typical "let go threshold" current is about 10 mA. The typical "let go threshold" for an average human body at the typical mains frequency is usually taken to be about 10 mA.

When the current flowing through the human body reaches a "ventricular fibrillation threshold", ventricular fibrillation will occur. The typical ventricular fibrillation threshold or an average human body is about 100 mA at the typical mains frequency. The actual ventricular fibrillation threshold depends on physiological parameters such as anatomy of the body, state of cardiac function, etc. as well as on electrical parameters such as duration and pathway of current flow.

Low frequency alternating current (AC) in the frequency range of between 15-100 Hz, for example at 50 Hz or 60 Hz, is considered to be more dangerous than direct current (DC) or high frequency AC, since the ventricular fibrillation threshold is considerably lower if the current flow is prolonged beyond one cardiac cycle. At these low frequencies, the let-go threshold is relatively low and the shock current can easily exceed the let-go threshold while not delivering enough initial energy to expel the person away from the source.

A current higher than the ventricular fibrillation threshold which passes through a human body can likely cause nerve or tissue damage, burns and death.

Mains power supply (or 'mains power' or 'main supply' in short) herein means the general-purpose alternating-current (AC) electric power supply which is also known as household power, household electricity, house current, power-line, domestic power, wall power, line power, AC power, city power, street power, grid power, etc. Most mains power in the world either operate at a standard frequency of 50 Hz (Europe) or 60 Hz (US) sinusoid.

DISCLOSURE

There is provided a power safety device and a power safety operation method to mitigate risks and hazards of electrical shock to a human or living body. The power safety device comprises determination circuitry for determining whether there is bodily contact of a human or a living body on load side of an electrical supply and control circuitry to operate a power switching device to establish a low impedance conduction path to permit flow of operation current from a source side to the load side only when no bodily contact of a human or a living body is detected on load side. The power safety operation method comprises determining whether there is bodily contact of a human or a living body on load side of an electrical supply, and operation of a power switching device to establish a low impedance conduction path to permit flow of operation current from a source side to the load side only when no bodily contact of a human or a living body is detected on load side.

Electrical properties of the human body are discussed in the standard document PD 6519-1: 1995 and IEC 479-1: 1994 published by the BSI (British Standards Institute). The document, or its updates and equivalents, is incorporated herein by reference.

Characteristic electrical properties of a human or living body include for example:
a) Impedance of the human body is not constant and varies with touching voltage.
b) Impedance of the human body is not constant and varies with duration of current passage.
c) Resistance of the human body is not constant and varies with touching voltage.
d) Impedance of the human body appears to compose of resistive and capacitive components in series and parallel when presents to electrical current.
e) Relationship of voltage and current through the human body is not linear.
f) Total body impedance and resistance approach an asymptotic value when exposed to different AC or DC voltages.

One or a plurality of the variable characteristic electrical properties of a human or living body is utilised to help or to facilitate determination of whether there is direct electrical body contact of a human or living body on the load side. Direct electrical body contact of a human or living body on the load side is undesirable since it can result in hazardous electrical shock when the power source is strong enough. Direct electrical body contact herein includes non-insulated or bare skin contact. The characteristic electrical properties may include one that is variable or invariable in response to variation in electrical signals. Variation in electrical signals includes variation in frequency, variation in current, and variation in voltage.

There is disclosed a power safety device comprising a controller and power connection circuitry. The power connection circuitry defines a switchable power connection path between a source side and a load side; wherein the power connection circuitry is switchable by the controller to operate in a first operation state or an on-state in which state impedance between the source side and the load side is very low to permit flow of operation current through the power connection circuitry, or a second operation state or an off-state in which state impedance between the source side and the load side is very high to impede flow of operation current through the power connection circuitry. The controller is to operate to transmit at least one type of probing signal to the load side when the power connection circuitry is in the off-state, and to evaluate and determine whether a response signal or a plurality of response signals from the load side contains at least one of a plurality of human characteristic responses indicative of direct electrical contact of a human body or a living body on the load side. The controller is to operate to switch the power connection circuitry from the off-state to the on-state if the responsive signals are determined to containing no indication or no reasonable indication of direct human or animal body contact on the load side.

A The plurality of human characteristic responses may include the following variable electrical characteristics: frequency variable or frequency dependent resistance and impedance, voltage variable or voltage dependent capacitance, time variable or time dependent resistance and impedance, time variable or time dependent capacitance, time variable or time dependent current density.

The human characteristic responses include at least one of the following variable electrical characteristics: a significant or substantial decrease of resistance with an increase in probing voltage in at least a range of probing voltages, a significant or substantial decrease of impedance with an increase in probing voltage in at least a range of probing voltages, a significant or substantial decrease of resistance with an increase in probing frequency in at least a range of probing frequencies, a significant or substantial decrease of impedance with an increase in probing frequency in at least a range of probing frequencies, and a significant or substantial decrease of current or current density with increase in probing time.

The range of probing voltages may be between 10 volt and 200 volt, for example, 10 or 20 volt to 100 or 200 volt, 10 or 20 volt to 50 volt, or a range which is formed by a combination of any of the following probing voltages: 10, 15, 20, 25, 30, 35, 40, 45, 50, 55, 60 volt. Where the voltage is above say 36 volt, a shorter probing time is preferred to mitigate in advertent shock. The voltage herein may be direct current voltage or root-mean square alternating current voltage. Probing voltages of 10 v, 18 v and 25 v are useful examples.

The probing frequency range may be a range that is between 25 Hz to 30 kHz, including 20 Hz or 25 Hz to 100 Hz, 150 Hz, or 20 kHz and 20 Hz or 25 Hz to 2 kHz, or a range which is formed by a combination of any of the following probing frequencies: 20 Hz, 50 Hz, 100 Hz, 150 Hz, 200 Hz, 300 Hz, 400 Hz, 500 Hz, 1 kHz, 1.5 kHz, 2 kHz, 2.5 kHz, 3 kHz, 5 kHz, 10 kHz, 15 kHz, 20 kHz, 25 kHz, and 30 kHz.

The probing time may have a range of between 10 ms to 1 second, between 10 ms to 100 or 200 ms or higher. For example, the probing time may extend to several seconds if there is initial doubt on whether there is living body contact. A probing time of between 20 ms to 50 ms, or 100 ms or 200 ms, is preferred for typical applications.

The human characteristic responses may include one or more of the following variable electrical characteristics: a more rapid rate of decrease of resistance and/or impedance with increasing probing voltages at lower probing voltages than higher probing voltages, a more rapid rate of decrease of impedance with increasing probing frequencies at lower probing frequencies than higher probing frequencies, asymptotic impedance for probing frequencies above 2 kHz to 5 kHz or below 25 Hz, a more rapid rate of decrease of impedance with increasing probing frequencies at lower probing voltages than higher probing voltages, and a more rapid rate of decrease of impedance in the initial 10 seconds than after the first 10 seconds.

The power safety device may comprises a probe signal source which is operable by the controller to transmit at least one type of probing signal to the load side, and a load monitor which is to monitor a plurality of responsive signals on the load side, the responsive signals including, for example, responsive voltages and responsive currents at different times, and the controller is to operate the probe signal source to transmit the probing signal to the load side when the power connection path is in the high impedance state and to collect and evaluate responsive signals through the load monitor, the responsive signal being a signal generated on the load side in response to the probing signal.

To help determine whether there is direct bodily contact on the load side, the load side is monitored and one or a plurality of electrical signals is collected from the load side to determine whether one or a plurality of characteristic variable electrical properties of a human or living body is present on the load side. The electrical signals to be collected may be one or a plurality of responsive signals generated in the load side in response to a testing signal or a probing signal sent to the load side. The responsive signals may include a plurality of voltage signals and/or a plurality of current signals taken during the probing time.

If the one or a plurality of responsive signals contain a sign or signal indicating possible direct bodily contact of a human or living body is detected on the load side, supply of operation power to the load side is likely to be hazardous and no operation power is to be supplied to mitigate risks of electrical shock.

If the one or a plurality of responsive signals contain no sign or signal indicating possible direct bodily contact of a human or living body is detected on the load side, the risks of electrical shock is considered to be low and supply of operation power to the load side will be permitted.

In addition to detection of possible direct bodily contact on the load side, additional safe operation conditions on the load side may be detected and utilised as additional safety measures.

For example, if open-circuit or short-circuit is detected on the load side, the load side would be classified respectively as in a non-operational state and an in an un-acceptable state and no operation power will be supplied. If impedance on the load side does not correspond to or match an expected or a target impedance or impedance range where the power safety device is for a designated, specific or target application, the load side would be classified as in an un-safe state and no operation power will be supplied.

To help determine whether one or a plurality of characteristic electrical properties of a human or living body is present on the load side, one or a plurality of testing or probing signals may be sent to the load side and one corresponding or a plurality of corresponding responsive signals are collected from the load side for evaluation and subsequent determination.

An example testing or probing signal may be one which is set to produce simulated electrical signals having a variation in electrical properties, for example, variation in signal frequency, variation in signal current, or variation in signal voltage.

The testing or probing signal is transmitted to the load side and a responsive signal generated in response to the probing signal is collected for evaluation and determination.

If the collected responsive signals contain information representative of a characteristic electrical property of human bodies, there is a strong indication that direct bodily contact is likely and flow of operational current is not to be allowed.

The testing or probing signals may be generated by a probe signal source.

The power switching device may be operated by a controller, for example, a microprocessor or MPU, a microcontroller or MCU, or other programme control device, to permit and impede operation power flow.

Power safety devices and power safety operation methods according to the present disclosure and there examples are set out in claims hereto.

FIGURES

The disclosure will be described by way of example with reference to the accompanying Figures, in which:

FIG. 1 is a block diagram depicting schematically an example power safety device, FIG. 1A is a schematic diagram depicting the example power safety device in use, FIG. 1B is a flow diagram depicting the example power safety device in probing operation, FIG. 2 is a schematic diagram depicting an example power safety device according to an embodiment, FIG. 2A is a schematic diagram depicting an example power circuit of the power safety device of FIG. 2, FIGS. 2B1 and 2B2 are schematic diagrams depicting example connection of signal collection devices of the power safety device of FIG. 2, FIG. 2C is a schematic diagram depicting an example signal processing circuit of the power safety device of FIG. 2, FIG. 2D is a schematic diagram depicting an example leakage detection circuit of the power safety device of FIG. 2, FIG. 2E is a schematic diagram depicting an enlarged portion of the power safety device of FIG. 2, FIG. 2F is an example flow chart showing an example operation flow of the power safety device of FIG. 2.

DESCRIPTION

A power safety apparatus of the present disclosure comprises a controller and power connection circuitry. The power connection circuitry defines a switchable power connection path connecting a source side and a load side. The power connection circuitry is switchable to operate in a first operation state or an on-state or a second operation state or an off-state. When in the ON-state, impedance between the source side and the load side is very low to permit flow of operation current through the power connection circuitry with minimal loss. When in the OFF-state, the impedance between the source side and the load side is very high to impede flow of operation current through the power connection circuitry. The controller is provided and arranged to promote safe electrical operations and to mitigate potential hazardous electrical conditions on load side, such as electrical shocks to a user.

To promote safety operations, the controller is arranged to first determine whether there is a real or reasonable likelihood of bodily contact, for example, human or animal body electrical contact, on the load side and to switch the power connection circuitry from the off-state to the on-state if outcome of determination is that there is no likelihood, meaning there is no real or reasonable likelihood, of direct living body contact on the load side.

Figure 1:
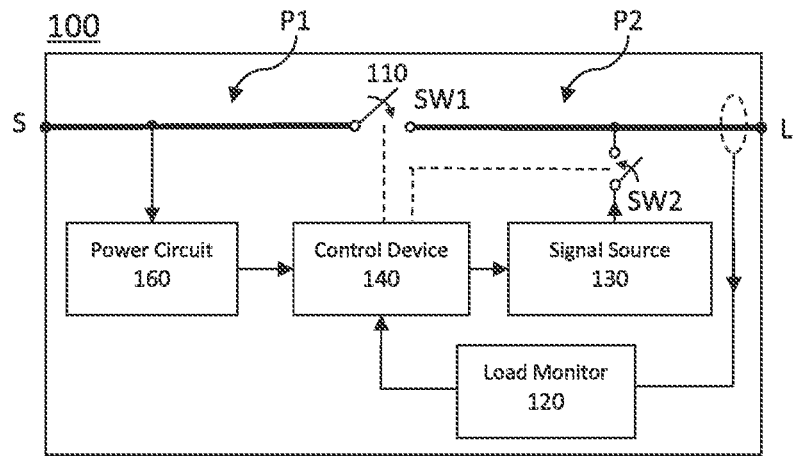

An example power safety device 100 comprises a switching circuitry 110, a load monitor device 120, a probing signal source 130, a control device 140, a power connection circuitry and a power circuit 160, as depicted in FIG. 1.

The power safety device 100 includes a first device side (or a source side S) which is for connection to a power source and a second device side (or a load side L) which is for connection to an electrical load. The power connection circuitry includes a first current conduction portion P1 which is connected to the first device side S, a second current conduction portion P2 which is connected to the second device side L, and a power switching device SW1 which is intermediate the first P1 and the second P2 current conduction portions. The power switching device SW1 is switchable between a first operation state of very low impedance and a second operation state of very high impedance. When the power switching device SW1 is in the very low impedance first operation state (or "ON state"), a very low impedance current conduction path is established between the first device side S and the second device side L to facilitate flow of operation current between the first device side S and the second device side L. When in this ON state, the first device side S and the second device side L are operationally connected for load operation, and operational load current will flow through the power safety device 100. When the power switching device SW1 is in the very high impedance second operation state (or "OFF state"), there is a very high impedance between the first device side S and the second device side L. When in this OFF state, the first device side S and the second device side L are operationally disconnected, flow of operational load current between the first device side S and the second device side L will be impeded. Where there is a current flow across the power safety device 100 during this OFF-state, the current will be limited by the very high OFF-state impedance of the power switching device SW1 and the current will be limited to a non-operational load current which is negligible and/or below a safety limit. An operational load current herein means a current of a magnitude which is intended or designated for a specific or designated load. For an electrical load, the operational load current may be the rated current or rated operation current of the load. The term "ON state" is interchangeably used with the terms "ON-state", "on state", "on-state", "closed state" and the term "OFF state" is interchangeably used with the terms "OFF-state", "off state", "off-state" or "open state" herein.

The probing signal source 130 is for generating probing signals. The probing signal source 130 is operable to generate probing signals and is connected to the load side L by a probing signal switch SW2. The probing signal switch SW2 is switchable between a low impedance ON-state and a high impedance OFF-state. When the probing signal switch SW2 is closed, the probing signal switch SW2 is in the ON-state and probing signals generated by the probing signal source will flow to the load side L. When the probing signal switch SW2 is opened, the probing signal switch SW2 is in the OFF-state and probing signals generated by the probing signal source will not flow to the load side L.

So that the controller can obtain and process information or data to determine whether there is likelihood of a living body in direct or naked electrical contact with the load side, the controller will perform load probing operations. In example, load probing operations, the controller will operate the probing signal source to generate load probing signals to the load side and evaluate a response signal or a plurality of responsive signals received from the load side in response to the probing signal to determine whether the response signals contain or carry characteristic properties of a living body. During load probing operations, the probing signal switch SW2 is closed and the power switching device SW1 is opened, a probing signal path is established between the probing signal source 130 and the second current conduction portion P2, and probing signals generated by the probing signal source 130 flows to the load side L. During non-probing operations, the probing signal switch SW2 is opened, the probing signal path between the probing signal source 130 and the second current conduction portion P2 is disconnected to isolate the probing signal source 130 from the second current conduction portion P2, and probing signals generated by the probing signal source 130 do not flow to the load side L. In some examples, the probing signal switch SW2 can be part of the probing signal source 130.

The load monitor device 120 comprises detection circuitry which is arranged to collect electrical signals, in particular responsive signals, from the load side L. The detection circuitry may comprise signal processing circuitry such as shaping circuitry, amplification circuitry, filtering circuitry and other useful circuitry to process electrical signals collected from the load side L for subsequent output. In some embodiments, the detection circuitry may comprise decision circuitry to provide a decision output or a plurality of decision outputs upon receiving signals from the signal processing circuitry. In some embodiments, the detection circuitry comprises devices for collecting responsive signals on the load side. A responsive signal is one which is generated in response to a probing signal.

The control device 140 as an example controller comprises control circuitry. The control circuitry comprises control device and/or control circuit arrangements which are arranged to manage and/or control operations of the power safety device 100. The control circuitry may comprise a microprocessor, memory and peripheral circuitry such as input, output and control ports. The control device 140 is connected to the load monitor device 120 for receiving electrical signals originated from the load side L. The control device 140 is connected to control switching operations of both the power switching device SW1 and the probing signal switch SW2.

The switching circuitry 110 comprising the power switching device SW1 and the probing signal switch SW2 is operatively controlled by the control device 140. For example, the control device 140 may operate or control the power switching device SW1 and the probing signal switch SW2 either individually or oppositely in synchronisation so that when one is turned on, the other is turned off. In some embodiments, the control device 140 may be connected to the probing signal source 130 to control its signal generation operations. Each of the power switching device SW1 and the probing signal switch SW2 may be implemented as solid state relays using MOSFET, thyristor or SCRs.

The power circuit 160 comprises power circuitry for supplying operation power to various components of the power safety device 100. The power circuitry comprises power circuit arrangements such as transformers and power regulators which are arranged to supply regulated power supply to the power consuming components of the power safety device 100 such as the load monitor device 120, the probing signal source 130 and/or the control device 140. An input of the power circuit 160 is connected to the first device side S and output of the power circuit 160 is connected to the power consuming components.

Figure 1A:
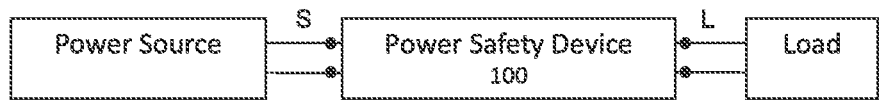

In typical applications, the power safety device 100 is connected to a power supply or a power source, with the first device side S connected to a power supply such as AC mains and the second device side L connected to a load, as depicted in FIG. 1A. Therefore, the first device side S is also conveniently called 'source side' and the second device side L called "load side" herein. The load can be any electrical powered apparatus, appliance or tools. In some example, the power safety device 100 may be operated by a power source which is independent of the source side power supply.

In use, the power safety device 100 is initially set to be in a stand-by mode. The power safety device 100 will be subsequently set into a power operation mode when conditions on the load side L are found or determined to correspond to safe operation conditions. A condition of safe operation herein includes a condition of no direct bodily contact of a human body or an animal body with the load side. This is also a condition which is safe to a human user, a human bystander or animals in proximity so that there is no real risk or there is only minimal risk of a user encountering injury causing electrical shock such as ventricular fibrillation during load operations.

When in the standby mode, no current exceeding a safety threshold in time and in current is allowed to flow through the power safety device 100 from the source side S to the load side L. To facilitate this, the power switching device SW1 is set into the OFF state when in the stand-by mode, and only to be switched into the operational mode subsequently after satisfactory determination of safe operation conditions on the load side. When in the power operation mode, normal operational current exceeding the safety threshold time and current will be allowed to flow from the source side S to the load side L, and through the power safety device 100. To facilitate this operation to allow flow of operational currents, the power switching device SW1 is set into the ON state when in the power operation mode.

In typical or example configurations, the power safety device 100 is set into the standby mode each time when the power safety device 100 is connected to an active power source and will remain in the standby mode until actuated to operate in the operational mode.

In typical or example configurations, the power safety device 100 is reset into the standby mode after each use or completion of a cycle of power operation. A cycle of power operation means an operation current has flowed through the power safety device 100 for a minimum operation duration and followed by a period of no operation current flow exceeding a predetermined threshold pausing period. An example threshold pausing period may be set to a few second or a few minutes.

When in the standby mode, the control device 140 will operate in a pre-power operation mode. During the pre-power operation mode, load side L electrical conditions are monitored and evaluated to determine whether the load side is in a safe operation condition. When in this pre-power operation mode, the control device 140 will operate to collect electrical signals from the load side and determine whether the collected electrical signals represent safe electrical conditions on the load side. The pre-power operation is also referred herein as a pre-actuation mode or a monitoring mode.

In example monitoring mode operations, the control device 140 will operate to compare the collected electrical signals with respect to reference electrical signals or reference electrical parameters to determine whether electrical properties on the load side correspond to electrical properties of safety operations. Safe electrical conditions or electrical properties of safety operations herein include a condition of no low impedance path between a human user and the load side which would give rise to a hazardous electrical shock once the load side is connected to the source side.

In example or typical monitoring operations, the power switching device SW1 is in the OFF state, the probing signal switch SW2 is in the ON state and probing signals generated by the probing signal source will be transmitted to the load side as probing signals and to the control device 140 as reference signals. The control device 140 on evaluating the collected probing signal and upon comparison with or with respect to the reference signals would be able to determine whether electrical properties on the load side correspond to electrical properties of safety operations.

Figure 1B:
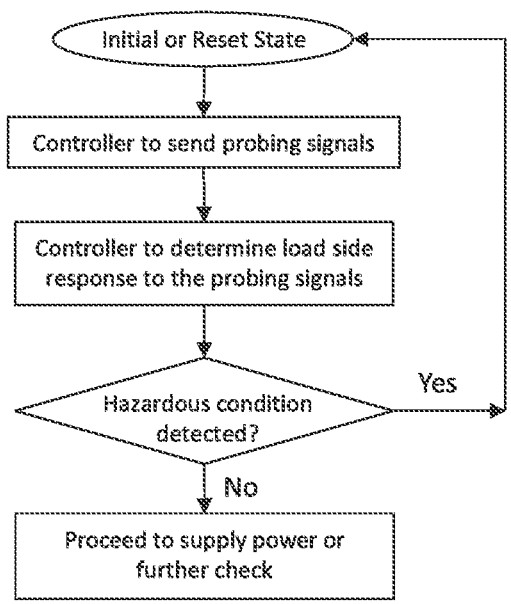

In an example monitoring mode operation flow, as depicted in FIG. 1B, the control devices 140 is at an initial state or a reset state and operates to cause sending probing signals to the load side. The control devices 140 then operates to evaluate responsive signals collected from the load side and determine whether the load side is in a safe operation condition by reference to the responsive signals and/or the probing signals. If the load side is safe for operation, the control devices 140 will proceed to operate in the next control mode. The next control mode may be a power operation mode, a mode of further checking, and/or a mode of further evaluation. If the load side is not safe for operation, the control devices 140 will return to the initial or reset state of no operation power supply to the load side.

While the power circuit 160 is connected to the source side S to obtain mains power supply for operation when in use, the power safety device 100 may be DC operated, for example, by battery operation. Where the power safety device 100 is DC operated, the power circuit may include DC-DC converters and/or DC-AC converters. In some applications, the power safety device 100 may be dually both battery and mains operated without loss of generality.

An example power safety device 200 of FIG. 2 comprises switching circuitry 210, a load monitor device 220, a probing signal source 230, a control device 240 and a power circuit 260, as depicted in FIG. 2. The power safety device 200 includes the same functional components of the power safety device 100 of FIG. 1 and the description thereon is incorporated herein mutatis mutandis where appropriate and with reference numerals increased by 100.

In the example power safety device 200, the power circuit 260 comprises two 220 v-to-9 v transformers which are connected in series to form a 220 v-to-18 v transformer. Rectified output of the transformer is voltage regulated by a power regulation arrangement 262 comprising voltage regulators. The transformer output comprises two output paths, namely, a first output path of 18 v AC to serve as probing signals and a second output path connected to a full wave rectifier to supply DC power to operate components of the power safety device 200. As shown in the circuit diagrams FIGS. 2A and 2H, the rectified output is connected to a first voltage regulator 7808. The first voltage regulator 7808 comprises two outputs, namely, a first voltage output of 8V DC output for driving operational amplifiers (Op-amp) and a second voltage output connected to a second voltage regulator 7805 to provide a voltage output of 5V DC output for microprocessor and peripheral devices operation.

The load monitor device 120 comprises two current transformers 222a, 222b as example of signal collection devices. Connection of the current transformers 222a, 222b is depicted in more detail in FIGS. 2B1 and 2B2. Each of the current transformers 222a, 222b has a transformer ratio and rating of 5 A/5 mA.

The current transformer 222a (or first current transformer) is for detection of current flowing through the second current conduction portion P2. Although a single wire is shown in FIGS. 1 and 2, each of P1 and P2 actually comprises a live and neutral wire as depicted in FIGS. 2B1 and 2B2.

Current transformer 222b (or second current transformer) is for detection of imbalanced current flowing through the second current conduction portion P2 and its associated neutral wire portion N.

Figure 2C:
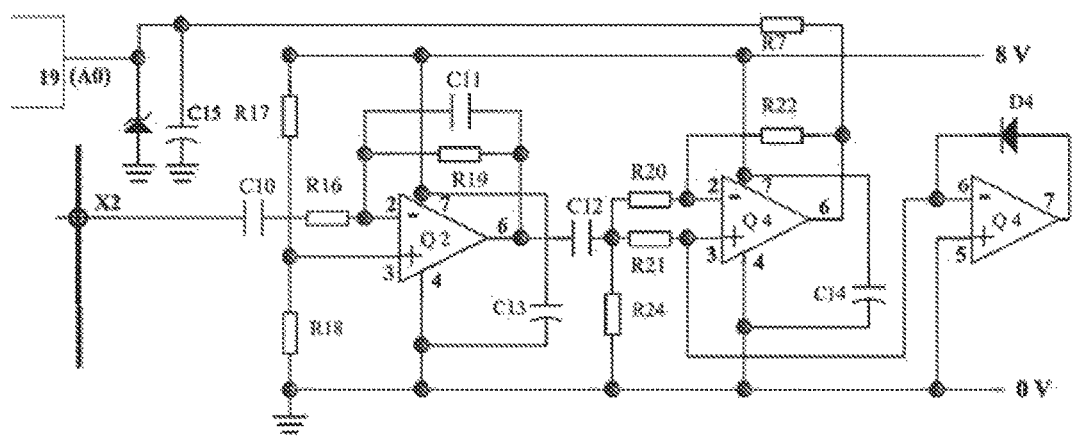
FIG. 2G is an example flow chart showing an example operation flow of the power safety device of FIG. 2.
FIG. 2H is a circuit diagram depicting an example circuit implementation of the example power safety device of FIG. 2.
FIGS. 2I and 2J are schematic diagrams depicting variation examples of the example power safety device of FIG. 2.

Electrical signals collected by the first current transformer are fed into a first signal processing circuit of the load monitor device 120 at terminal X2, as depicted in FIG. 2C. Referring to FIG. 2C, collected electrical signals coming in from the first current transformer are to be amplified by an AC-coupled inverting amplifier with a low-pass filter Q2 in which the voltage output ($V_{out}$) at Q2 is $V_{out}=[-(R19/R16) \times Vin(p-p)]+V_{bias}$, where $V_{bias}=V(Q2-pin3)=4V$, in this example. The low pass frequency is set to be about 70~80 Hz with C11=0.022 µf, R19=100K, the input coupler C10 is a 10 µf (10E-6) monolithic ceramic capacitor, and R16 should not less than 400Ω. The amplified output signal is then coupled to Q4 by C12, Q4 acts as a full wave rectifier that transduces the AC signal to DC. The DC signal is then output to an A/D convertor of the microprocessor through a R/C filter which comprises R7 and C15. To prevent overshot, a 5.1 v Zener diode is connected at the input of the A/D convertor to cap the input voltage to 5V.

Figure 2D:
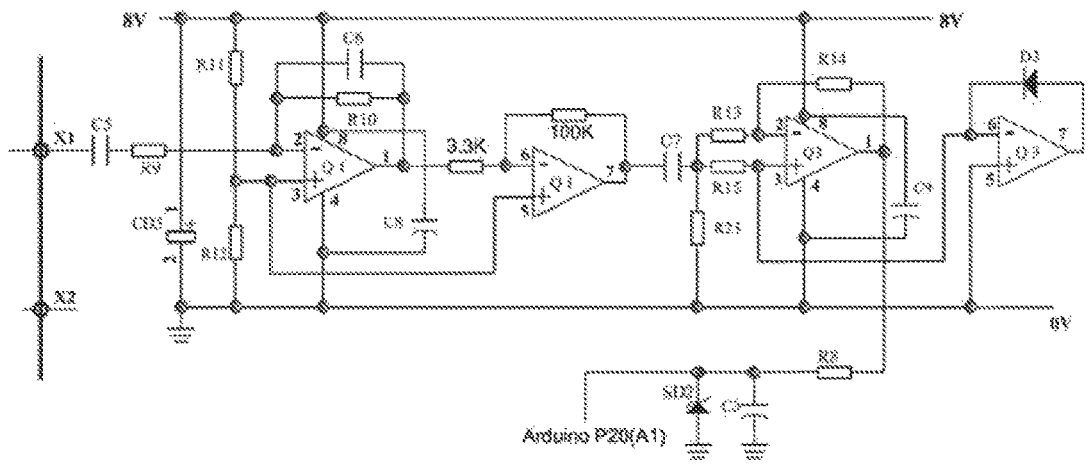

Electrical signals collected by the second current transformer are fed into a second signal processing circuit of the load monitor device 120 at terminal X1, as depicted in FIG. 2D. The second signal processing circuit is substantially identical to the first signal processing circuit, but with a higher gain set by R9 and R10 and an additional amplifier stage added between pin 1 of Q7 and C7 to enhance sensitivity.

Figure 2E:
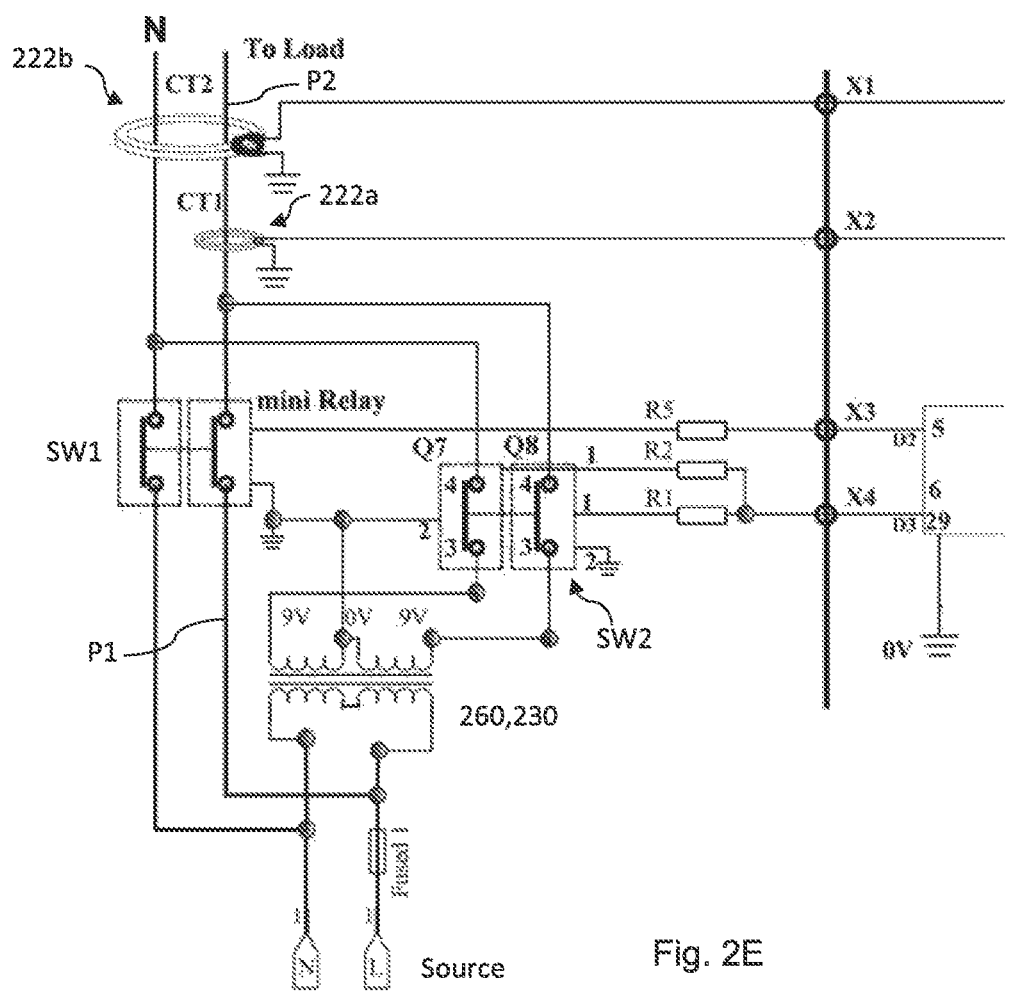
Figure 2F:
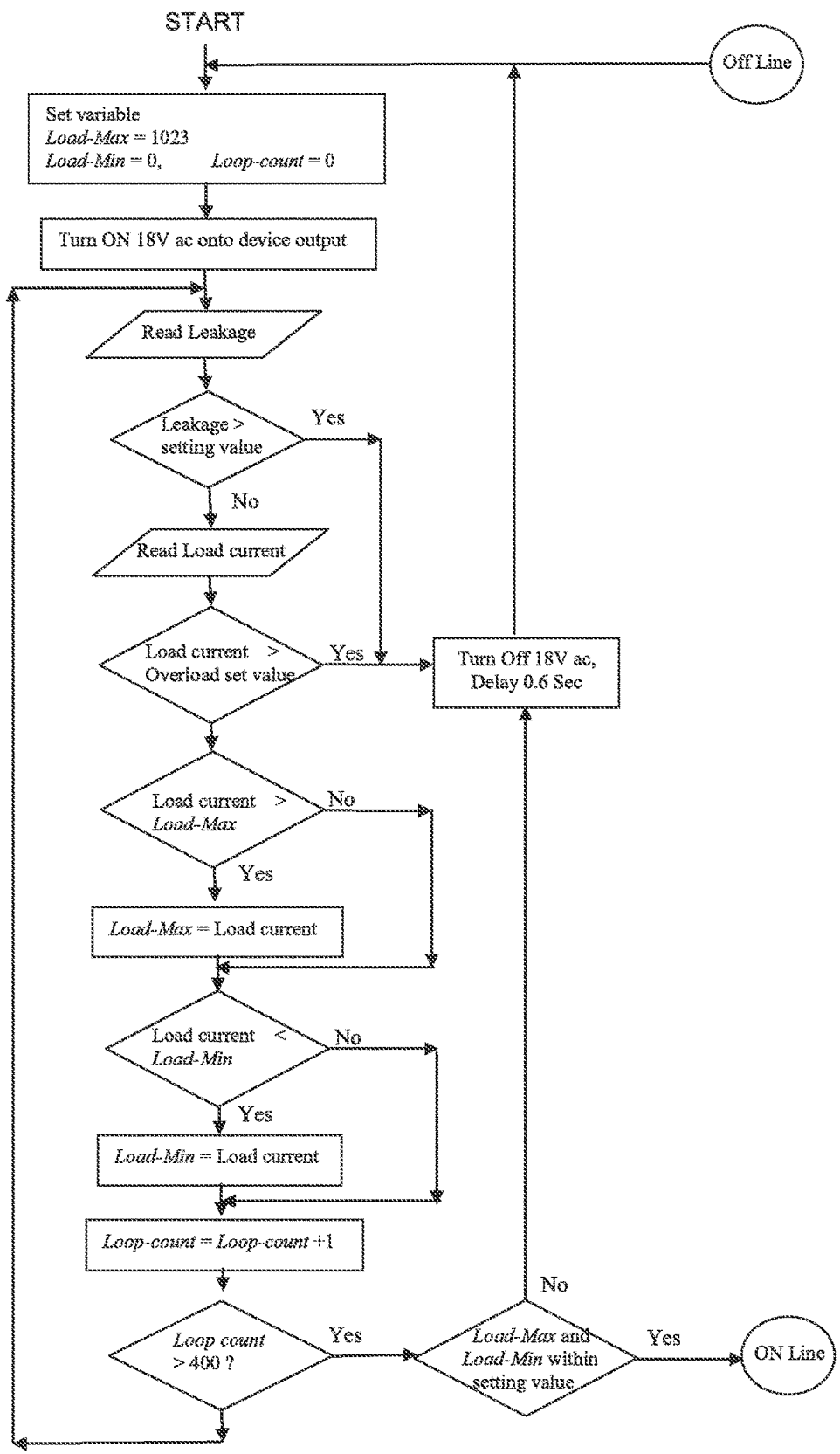

Referring to FIG. 2E, the example power switching device SW1 comprises first and second mini relays which are respectively on the second current conduction portion P2 and its associated neutral wire portion N, and the example probing signal switching device SW2 comprises first and second mini relays which are respectively labelled Q7 and Q8.

In this arrangement, the 18 v transformer operates both as a power circuit 260 and a probing signal source 230.

In use, the power safety device 200 is initially set to operate in the standby mode with the two mini relays of SW1 opened to impede flow of operation current and Q7 and Q8 of SW2 closed for probing signal passage. When Q7 and Q8 are closed, AC voltage signals originating from the 18 v transformer will be transmitted to the load side as probing signals after passing through Q7 and Q8. The electrical signals collected by the current transformers 222a, 222b will be processed by the first signal processing circuit and the processed signals will be used by the control device 240 to determine the collected electrical signals carry the properties corresponding to safe operation on the load side.

In example probing operations during the standby mode, Q7 and Q8 are closed for 0.1 second (or 100 ms) and electrical signals collected by the first current transformer during this probing period are analysed by the control device 240. After the probing period, both the switches SW1 and SW2 are opened for a short pausing duration so that no probing current and no operation current will through the power safety device 200. If result of analyses of the collected electrical signals is positive or satisfactory, that is, the collected electrical signals corresponding to safe operation or loading conditions on the load side, the control device 240 will operate to close the power switching device SW1 after, say 0.2 second has lapsed after the switches SW1 and SW2 were last opened and the probing signal switch SW2 will remain open. The power switching device SW1 will be maintained in the closed state by the control device 240 until operation current has ceased to flow for a threshold pre-set pausing time and the power safety device 200 will be reset to the standby mode when this occurs. The power safety device 200 comprises a zero crossing detection circuit Q9 so that power supply to the load side is switched in at zero crossing of the source side S.

If result of analyses of the collected electrical signals is negative or non-satisfactory, that is, the collected electrical signals corresponding to un-safe or abnormal operation or loading conditions on the load side, the control device 240 will operate to close the probing signal switch SW2 again for 0.1 second after a resting period, say 0.6 second, has lapsed after the switches SW1 and SW2 were last opened and the power switching device SW1 will remain open during the probing operation cycles. This probing operation will repeat until a threshold probing time limit has reached and the probing cycle will come to an end, possibly with emission of an alarm signal to alert user of danger or malfunction. As depicted in an example operation flow of FIG. 2F, a maximum number of 400 probing cycles have been set before the probing operations are ended.

Figure 2G:
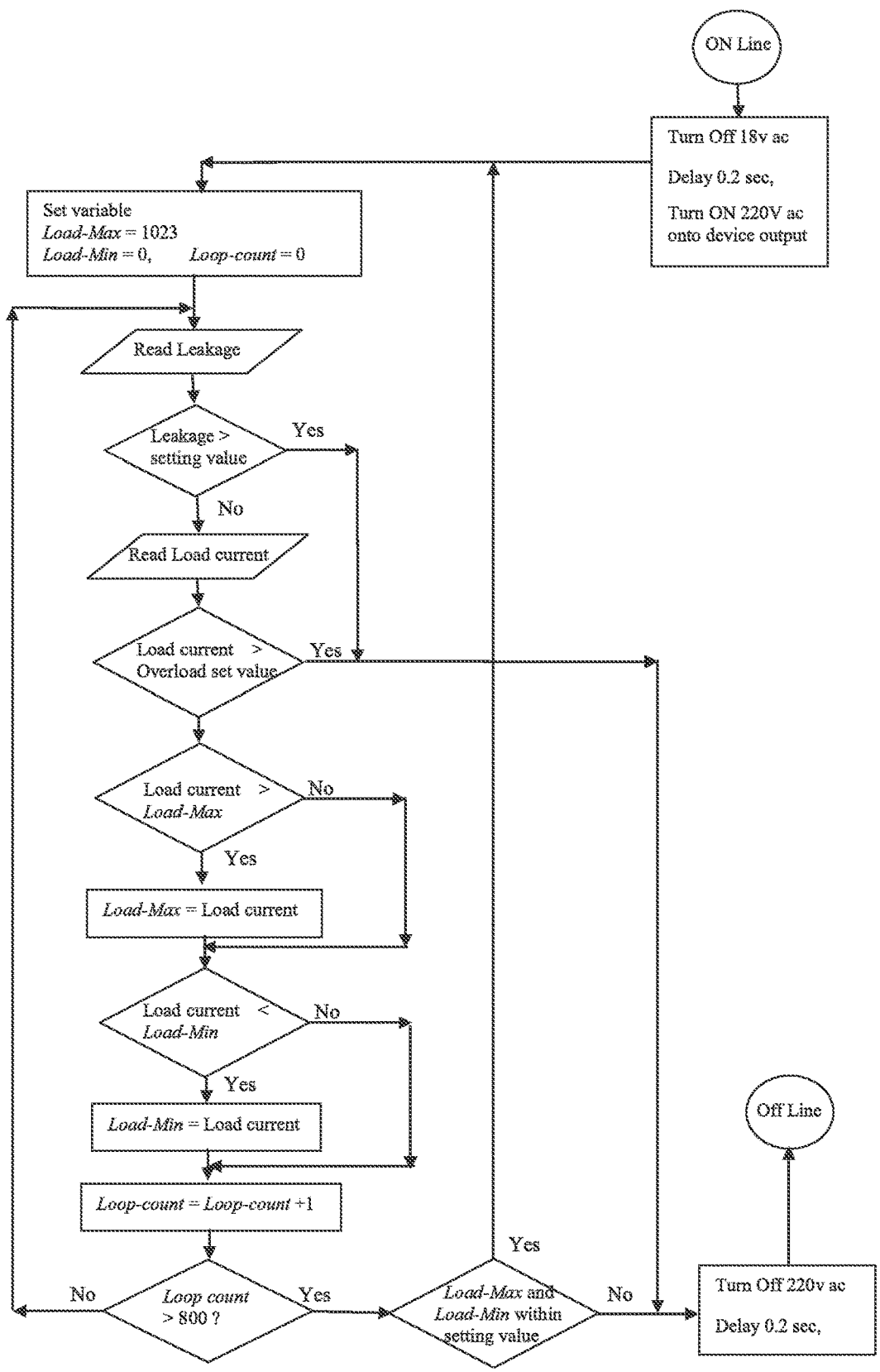
Figure 2H:
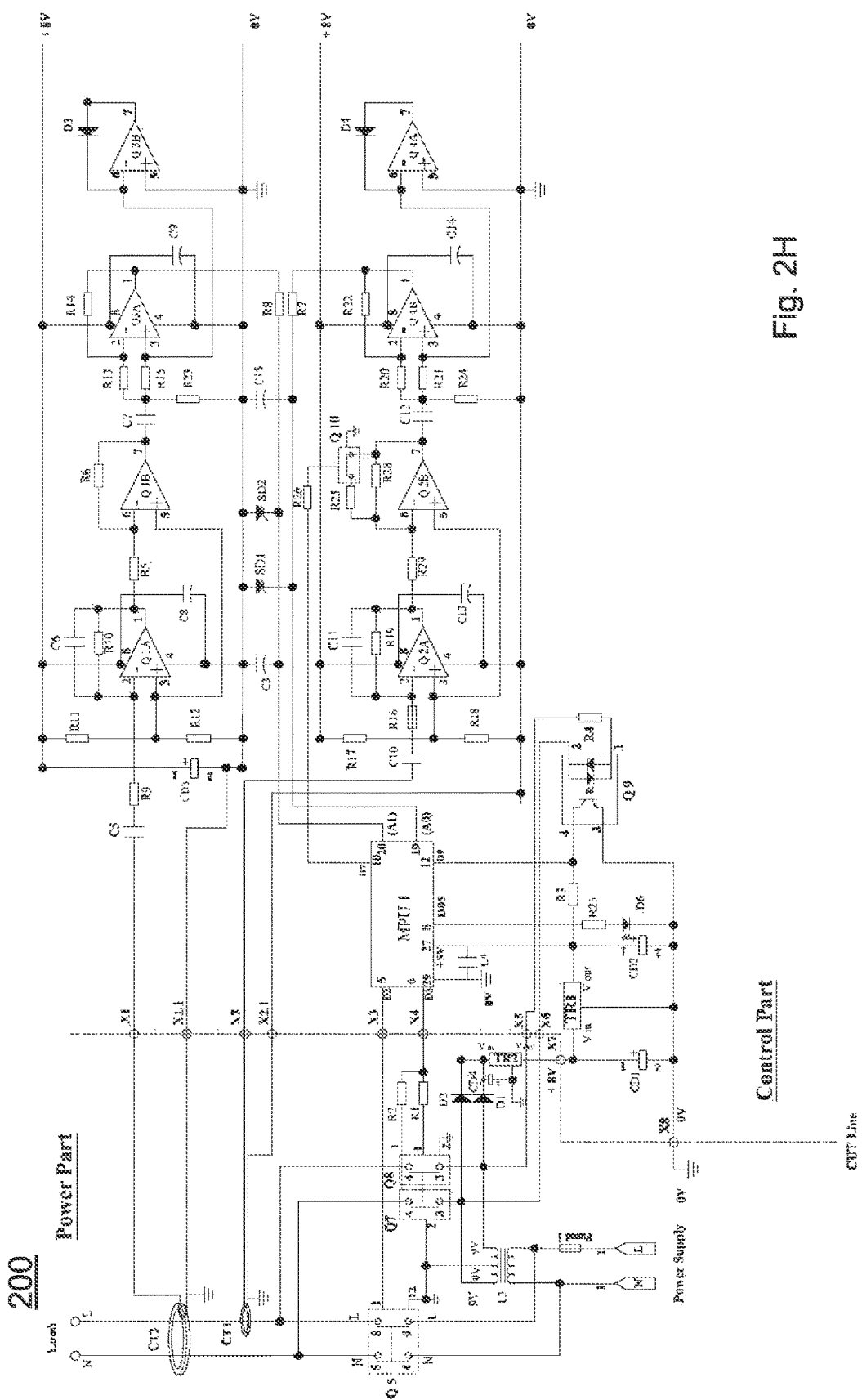

After the power switching device SW1 has been closed to permit operation, the control device 240 will continue to monitor electrical conditions on the load side during operations when operational current flows through the power safety device 200. An example operation flow of in-operation monitoring is depicted in the flow diagram of FIG. 2G. Referring to FIG. 2G, output of the second current transformer carries leakage current information and the leakage current information will be analysed by the control device 240 to determine whether there is any leakage current. If there is significant current leakage, the control device 240 will open the power switching device SW1 to stop operation current flow, and possibly generation an alarm signal.

The control device 240 may be set to operate to vary the probing signal frequency to produce a probing signal with variation in signal frequency.

Figure 2I:
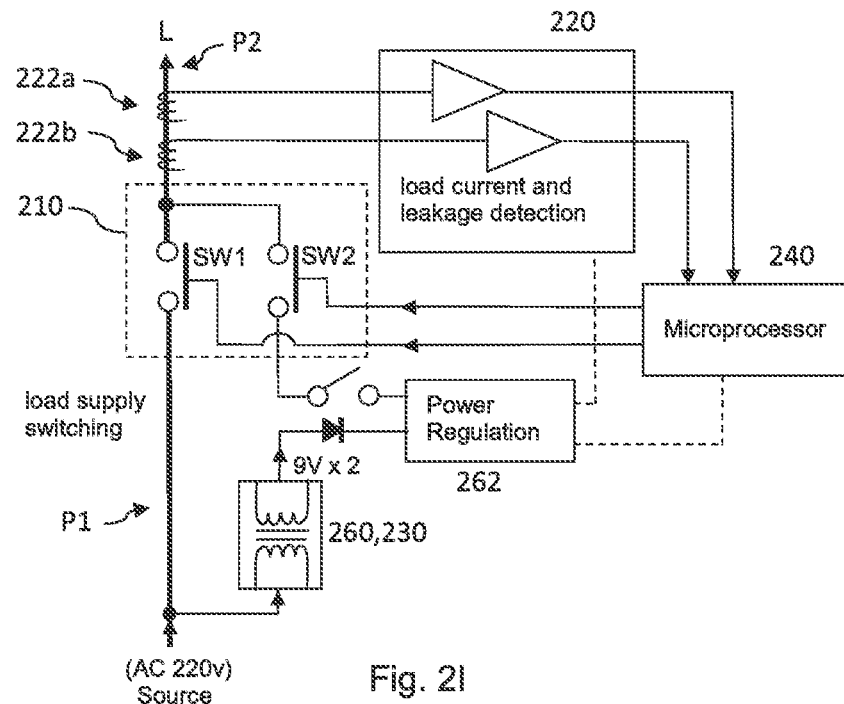

As an example variation, the probing signal source 230 may be connected to the output of the power regulation arrangement 262 instead directly to the AC output of the transformer, as depicted in FIG. 2I. Where the probing signal source 230 is connected to a DC output of the power regulation arrangement 262, the probing signal frequency may be controlled and varied by the microprocessor 240. As a typical microprocessor would have a main clock running at several megahertz (MHz), the probing signal frequency can be set at a few Hz, a few hundred Hz, a few kHz or, a few tens of kHz, or a few hundred kHz or can be varied in a selected range of frequencies without loss of generality. When the probing signal source is a DC source, the probing signal would comprise a train of square pulses.

Figure 2J:
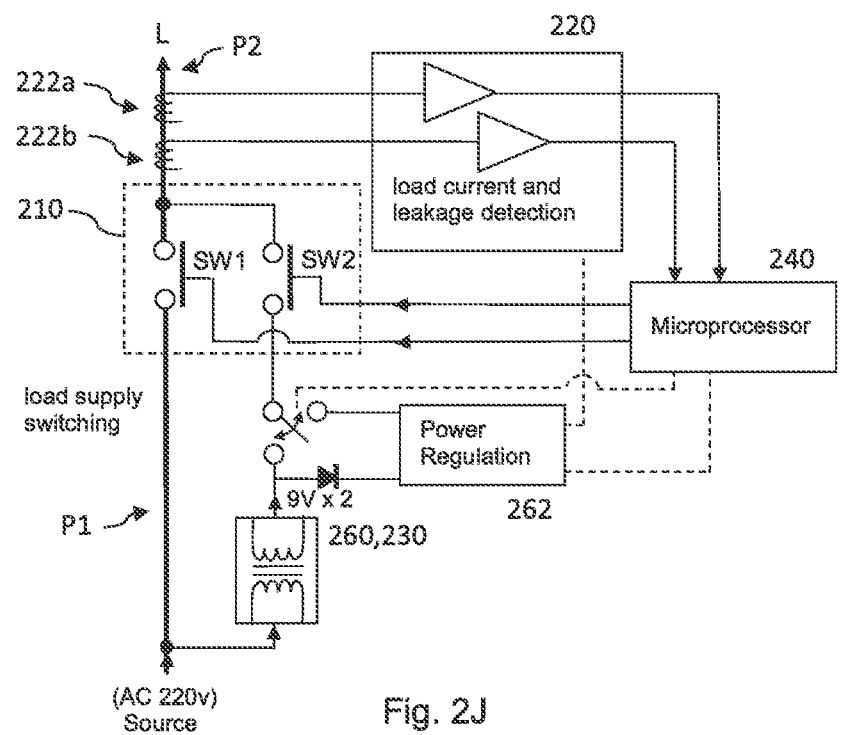

In another example variation, the probing signal source 230 may be selectively connected to both the output of the power regulation arrangement 262 and to the AC output of the transformer, for example, by a switch operated by the control device 240, as depicted in FIG. 2J. When provided with this signal source selectivity, the transformer AC output, the power regulation arrangement 262 output, or their combination can be used as a probing signal source.

A single chip microprocessor, for example, ATMega328™ 8 bit microcontroller running at 16 MHz working at 5V, is used as a core CPU or MPU of the control device 140, 240.

Figure 3:
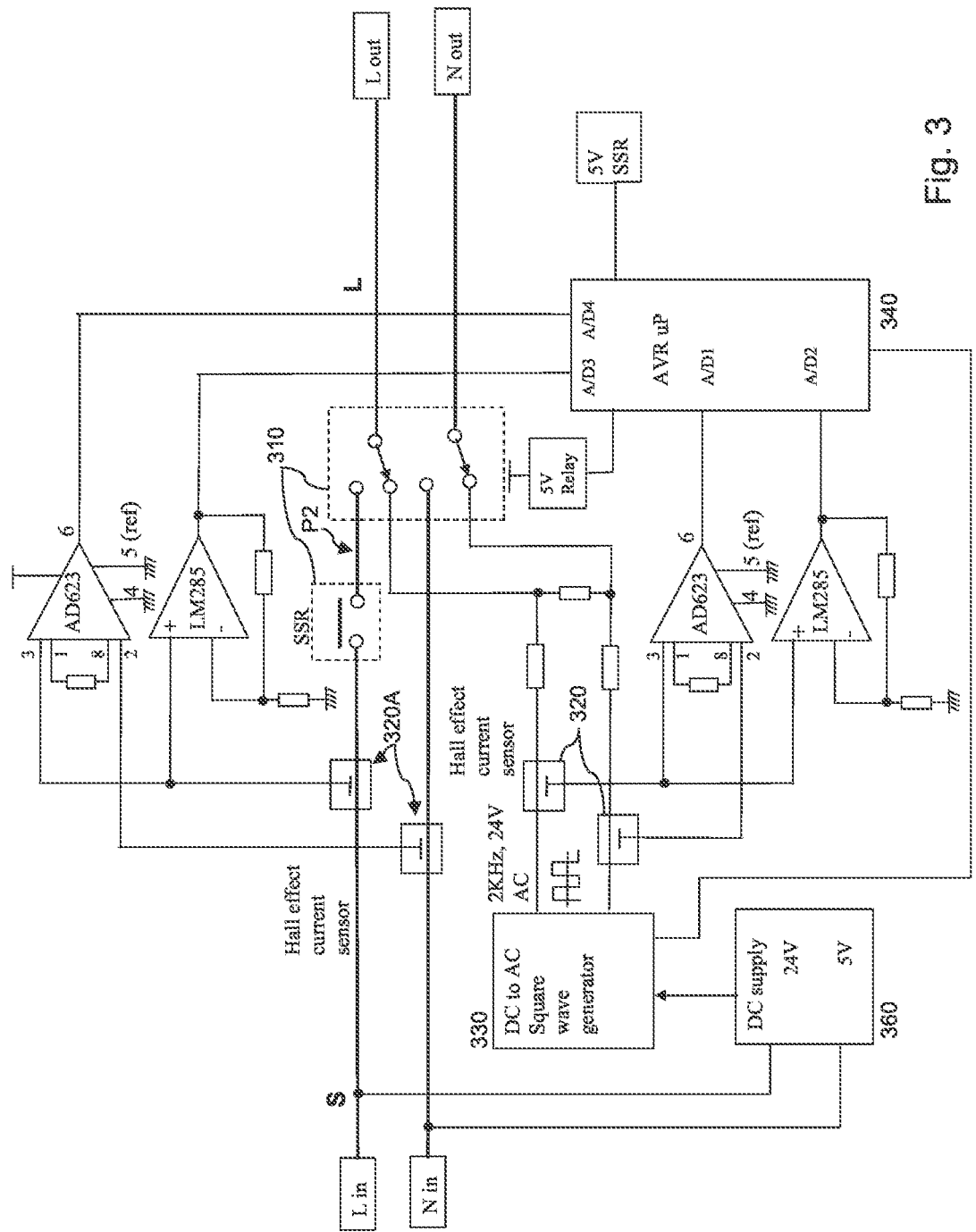
FIG. 3 is a hybrid circuit diagram depicting an example circuit implementation of the example power safety device.
Figure 4:
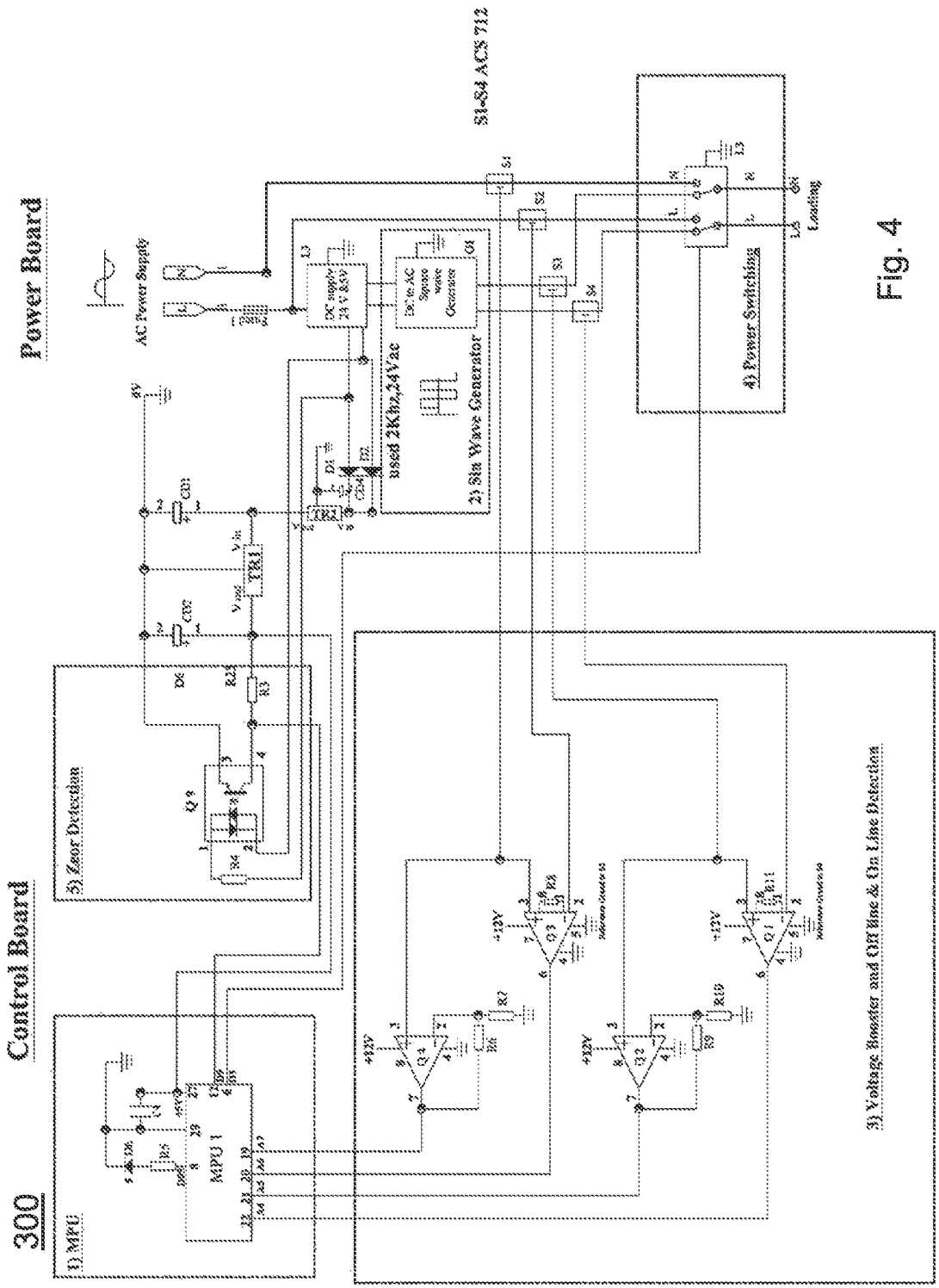
FIG. 4 is another circuit diagram depicting an example circuit implementation of the example power safety device of FIG. 3.

An example power safety device 300 of FIGS. 3 and 4 comprises a switching circuitry 310, a load monitor device 320, a probing signal source 330, a control device 340 and a power circuit 360, as depicted in FIG. 3. The power safety device 300 includes the same major functional components of the power safety device 100 of FIG. 1 and the description thereon is incorporated herein mutatis mutandis where appropriate and with reference numerals increased by 200.

In this embodiment, the switching circuitry 310 comprises a pair of relays which is operable as probing signal switches to connect the load side L with the probing signal source or with a second current conduction portion P2, and a power switching device SSR which is to connect the second current conduction portion P2 with the first current conduction portion P1 when switched in to the ON state of low impedance.

The probing signal source 330 is a standalone signal generator which is arranged to generate probing signals in the form of a train of square waves of a selected frequency or selected frequencies. The square wave example probing signals are at 24 v rms and the frequency is variable between 0 and 2 kHz. During probing operations, groups of 40 ms duration of probing signals are sent to the load side.

The load monitor device 320 comprises a pair of Hall effect transducers for collection of responsive electrical signals from the load side and output of the Hall effect transducers are low-pass amplified before reaching the control device 340. The load monitor device 320 comprises another pair of Hall-effect transducers for collection of electrical signals from the load side and carrying properties of operation current. Likewise, output of the Hall effect transducers are low-pass amplified before reaching the control device 340.

As a variation, the standalone signal source may be a sinusoidal signal generator or a signal generator which can be set to selectively generate square, sinusoidal or saw tooth probing signals without loss of generality.

Table 1 below sets out example variations of the total body impedance (in $\Omega$) of the human body (hand to hand current path, large surface of contact) with respect to touch voltage ($V_t$) at AC 50/60 Hz at three percentiles of the population:

TABLE 1

(source: British standard PD6519-1:1995; IEC 479-1:199)

| Vt | 5% | 50% | 95% |
|---|---|---|---|
| 25 | 1750 | 3250 | 6100 |
| 50 | 1450 | 2625 | 4375 |
| 75 | 1250 | 2200 | 3500 |
| 100 | 1200 | 1875 | 3200 |
| 125 | 1125 | 1625 | 2875 |
| 220 | 1000 | 1350 | 2125 |
| 700 | 750 | 1100 | 1550 |

TABLE 1-continued (source: British standard PD6519-1:1995; IEC 479-1:199)

| Vt | 5% | 50% | 95% |
|---|---|---|---|
| Asymptotic value (Ω) | 650 | 750 | 850 |

It is noted from Table 1 that the value of total body impedance decreases with increase in the DC touch voltage magnitude.

Table 2 below sets out example variations of the total body resistance (in Ω) of the human body (hand to hand current path, large surface of contact) with respect to touch voltage ($V_t$) at DC at three percentiles of the population:

TABLE 2

(source: British standard PD6519-1:1995; IEC 479-1:199)

| $V_t$ | 5% | 50% | 95% |
|---|---|---|---|
| 25 | 2200 | 3875 | 8800 |
| 50 | 1750 | 2990 | 5300 |
| 75 | 1510 | 2470 | 4000 |
| 100 | 1340 | 2070 | 3400 |
| 125 | 1230 | 1750 | 3000 |
| 220 | 1000 | 1350 | 2125 |
| 700 | 750 | 1100 | 1550 |
| Asymptotic value (Ω) | 650 | 750 | 850 |

It is noted from Table 2 that the value of total body resistance decreases with increase in the magnitude of the touch voltage of the same frequency. Reported measurements have indicated that the total body resistance or impedance for the current path hand to foot is lowered than for a current path hand to hand by 10% to 30% as a reference.

It is noted that each of the value of the total body resistance and the value of the total body impedance decreases very rapidly when touch voltage of the same frequency is increased from a very low value to up to 200 volt, the rate of decrease is notably more rapid when touch voltage of the same frequency is increased from a very low value to up to 75 volt, and the rate of decrease is notably even more rapid when touch voltage of the same frequency is increased from a very low value to up to 50 volt.

It is noted that the initial body resistance and the initial body impedance of the human body is lower than the asymptotic values of tables 1 and 2. The generally accepted initial body resistance and initial body impedance is about 500Ω. This initial body resistance limits the peak value of the current to flow through a human body at the moment when the touch voltage occurs. This initial body resistance functions to provide resistance against short pulsed shock by limiting the initial current peaks. The initial resistance $R_o$ depends mainly on the current path and to a lesser extent on the surface area of contact.

The human body is typically modelled as an RC ladder network comprising both resistive ("R") and capacitive ("C") characteristics. Due to the capacitive characteristics, the total body impedance is expected to decrease with increase in frequency. However, it is noted that the human model is not a straightforward RC ladder network in which the values of the resistive component element and/or the values of the capacitive component element are constant or will stay constant on contact with a touch voltage. It is noted that i) the resistance and/or impedance of a human body decreases with increasing frequency, ii) the resistance and/or impedance of a human body decreases with increase in touch voltage, iii) the rate of decrease of impedance with increase in touch voltage frequency is dependent on the touch voltage, iv) the rate of decrease of impedance with increase in touch voltage frequency is higher for a lower touch voltage and lower for a higher touch voltage, v) touch current density at a touch voltage decreases with touch time, and vi) touch current density at a touch voltage decreases more rapidly during an initial touch and decreases at a substantially slower rate after the initial touch period. The abovementioned properties are jointly and severally referred to as "characteristic variable electrical properties of a living body" herein and each variable property is referred to as a "characteristic variable electrical property of a living body" without loss of generality.

For example, at a probing voltage of 10 v, an example human average impedance at 50 Hz is about 4-8 times of that at 2 kHz; at a probing voltage of 18 v, an example human average impedance at 50 Hz is about 4.8-13 times of that at 2 kHz; at a probing voltage of 25 v, an example human average impedance at 50 Hz is about 4.4 to 13 times of that at 2 kHz. In another perspective, the average impedance of a human body at 500 Hz (at probing voltages of 10 v, 18 v and 25 v) is only about 35-40% of that at 50 Hz, the average impedance (at probing voltages of 10 v, 18 v and 25 v) of a human body at 2 kHz is only about 13-15%% of that at 50 Hz and 35% of that at 500 Hz. For example, it has been observed that the average impedance (at probing voltages of 10 v, 18 v and 25 v) at 50 Hz is about 6-8 times of the impedance at 2 kHz, the impedance at 50 Hz is about 2.5-3 times of the impedance at 500 Hz, and the impedance at 500 Hz is about 3-4 times of the impedance at 2 kHz;

For example, touch current density exhibits a sharp fall during the initial 5 to 10 seconds of touch voltage exposure and the fall is substantially slower after the initial 5 to 10 seconds. For example, the rate of fall in the first 5 seconds is at least about 4 times faster than the fall in the next 5 seconds, that is, 6-10 seconds, and 10 times faster than the rate of fall after the initial 10 seconds.

It is further noted that the total body impedance decreases very rapidly when the frequency of the same touch voltage magnitude increases from 25 Hz to 5000 Hz (or 5 kHz). The decrease is more rapid in the frequency range of 50 Hz to 2500 Hz, and even more rapid in the frequency range of 50 Hz to 1000 Hz. It is noted that the most rapid rate of change of total body impedance occurs in the region of between 50 Hz and 150 Hz. For example, a drop of about 20% is observed when the frequency increases from 50 Hz to 100 Hz (i.e., approximately 2% per Hz), a total drop of 52% is observed when the frequency increases from 50 Hz to 500 Hz (i.e., approximately 1.2% per Hz). It is also noted that the drop at below 50 Hz and the drop at above 1000 Hz is slower than the drop between 50 Hz and 1000 Hz. These trends and properties of change are observed when the touch voltages are at 10 v and 25 v and believed to be quite comparable for touch voltages of between 10 v and 50 v, or up to 100 v.

Studies have shown that for AC current of between 15 Hz and 100 Hz, a body current magnitude of below 0.5 mA is not perceptible and a body current of between 0.5 mA and a safe perceptible body current-time limit is perceptible-and-safe. The perceptible body current-time limit is 10 mA for duration of above 2 seconds and is 200 mA minus a duration dependent decrement factor for duration at or below 2 seconds. For example, the perceptible body current-time limit is 10 mA for 2 seconds and 200 mA for 10 ms. A body current time exceeding the perceptible body current-time limit may reach the "let go threshold" and become hazardous.

For DC, the trends and characteristics are somewhat similar. For example, a body current magnitude of below 2 mA is not perceptible and a body current of between 2 mA and a safe perceptible body current-time limit is perceptible-and-safe. The perceptible body current-time limit is 10 mA for duration of above 2 seconds and is 200 mA minus a duration dependent decrement factor for duration at or below 2 seconds. For example, the perceptible body current-time limit is 30 mA for 2 seconds and 200 mA for 10 ms. A body current time exceeding the perceptible body current-time limit may reach the "let go threshold" and become hazardous.

The variable electrical properties noted herein are characteristic electrical properties which can be used to determine whether there is direct electrical contact of a human body or a living body on the load side. One or more human body electrical properties, that is, characteristic variable electrical properties of a living body, and the associated characteristics may be used to determine whether the load side is safe. For example, one or more load side electrical properties and/or characteristics may be measured and/or determined to identify whether there is any characteristic electrical property indicative of living body contact:

(a) Initial resistance on the load side (or load side resistance). The initial resistance may be measured or determined by applying a DC probing voltage on the load side and measuring the DC current response from the load side, or by applying a DC probing current on the load side and measuring the DC voltage response from the load side.

(b) Initial impedance on the load side (or load side impedance). The initial impedance may be measured or determined by applying an AC probing voltage on the load side and measuring the AC current response from the load side, or by applying an AC probing current on the load side and measuring the AC voltage response from the load side.

(c) Load side resistance change with change in DC voltage magnitude. The load side resistance change may be determined by applying a DC probing voltage of different voltage magnitudes to the load side and by measuring the DC current responses on the load side, or by applying a DC probing current of different current magnitudes to the load side and by measuring the DC voltage responses from the load side.

(d) Load side impedance change with change in AC voltage magnitude. The load side impedance change with change in AC voltage magnitude may be determined by applying an AC probing voltage of the same frequency at different voltage magnitudes to the load side and by measuring the AC current responses on the load side, or by applying an AC probing current of the same frequency and different current magnitudes to the load side and by measuring the AC voltage responses from the load side.

(e) Load side impedance change with change in AC frequency. The load side impedance change with change in AC frequency may be determined by applying an AC probing voltage of a constant voltage magnitude at different frequencies to the load side and by measuring the AC current responses on the load side, or by applying an AC probing current of a constant current magnitude at different frequencies to the load side and by measuring the AC voltage responses on the load side.

The load side electrical properties and/or characteristics of (a) to (e) above can be determined, for example, by applying an probing voltage of a plurality of voltage magnitudes at a plurality of frequencies (from DC to a selected upper AC frequency) to the load side and by measuring the corresponding DC and AC current responses on the load side, or by applying an AC probing current of a plurality of current magnitudes at a plurality of frequencies to the load side and by measuring the corresponding DC and AC voltage responses on the load side.

The load side electrical properties and/or characteristics obtained are then compiled and evaluated to determine whether there is a good likelihood of human body or living body direct contact on the load side. The determination may be with reference to one or more human body electrical properties or the associated characteristics.

The probing current may be selected to be one that is non-perceptible. The probing current may be selected to be one that is perceptible-and-safe. A perceptible-and-safe probing current would provide indication to a user of potential electrical shock hazard of the load. Where a larger probing current is required or preferred, the probing current may be selected to be in the perceptible-and-safe region or between the perceptible-and-safe limit and the "let go threshold". The probing signal source may include a current source or a current limiter to control the probing current magnitude.

To facilitate measurements of change with respect to change in frequency, the probing signal source would comprise a signal generator to generate AC probing signal. For example, the probing signal source may comprise a signal generator to generate AC probing signals of a plurality of frequencies. The probing signal frequency may span across a wide spectrum in order to assist observation of noticeable changes. For example, the frequency range may between DC to 10 kHz, DC to 5 Kz, or DC to 2.5 Hz. A plurality of discrete AC frequencies may be used as probing frequencies, for example, 25 Hz, 50 Hz, 60 Hz, 100 Hz, 200 Hz, 500 Hz, 1 kHz, or 2 kHz. In an example, a set of probing frequencies comprising 50 Hz, 500 Hz and 2 kHz is used. The probing frequencies may be selected to define or correspond to regions of different electrical properties, for example, different rates of change of electrical properties characteristic of a human or a living body when subject to electrical touch.

For example, the probing frequencies may be selected to define or correspond to regions of slow change, medium change, and rapid change characteristics of a human or a living body. The measured properties are then compared with corresponding characteristics of a human or a living body to determine whether there is a reasonable likely of human body contact on the load side.

The probing voltage may be selected to correspond to a probing current which is non-perceptible to human. The probing voltage may be selected to correspond to a probing current which is perceptible-and-safe. Where a larger probing current is required or preferred, the probing voltage may be selected to correspond to a probing current which is in the perceptible-and-safe region or between the perceptible-and-safe limit and the "let go threshold". The probing signal source may include a voltage source and/or a current limiter to control the probing current magnitude to the load side.

The resistance or impedance of an electrical current path comprising a human body in series with a power supply can range from a minimum of around 500Ω to 800Ω to several hundred kΩ (kilo-ohm) or multiple MΩ or mega-ohm, depending on various factors such as insulation state of the human body.

In order to devise useful probing signals in light of the wide range of possible human body resistance or impedance values, probing signals of an adequate magnitude that would result in noticeable responses from the load side would be useful. In order that the probing signals, for example, probing voltage or probing current, can have a sufficiently large magnitude but is still safe to a human user, the probing signal source may be an adaptive signal source which is to generate probing signals of a magnitude or magnitude according to the load side electrical conditions.

In some examples, a safe probing voltage that would result in a safe probing current may be used, for example, initially when determining initial body impedance or initial body resistance. It is noted that a probing voltage which is between 10 v to 36 v is a reasonably safe probing voltage range, at least initially when the human body resistance or impedance values is not known. In some examples, a plurality of probing voltages selected within the safe probing voltage range is used. For example, to determine the initial resistance and impedance, and/or their change in response to change in voltage and frequency. In some examples, probing voltages of 10V, 15 v and 25 v are selected to provide a large or sufficient difference in probing voltages within the safe probing voltage range.

In some example, the probing signal is in the form of a square pulse train. A probing signal comprising a train of square pulses is advantageous since a square wave is easier to generate and comprises a plurality of signal frequencies of different magnitudes so that a single train of square probing pulses can be used to replace a plurality of probing signals of different frequencies and/or different magnitudes.

To utilise the voltage responsive variation properties, the probing signal source may set to transmit a probing signal comprising a plurality of probing voltages and the collected responsive signals are analysed to determine whether the trend of the responsible signals is consistent with the expected trend of decreasing impedance and/or decreasing resistance with increasing voltage, and/or asymptotic impedance or asymptotic resistance; and/or whether the fall is within limits of expected response. In example applications, voltages of 10 v, 18 v and 25V are used.

To utilise the impedance variation properties, transmit a probing signal comprising a plurality of probing frequencies and the collected responsive signals are analysed to determine whether the trend of the responsible signals fall within limits of expected response, for example, decreasing impedance with increasing frequency indicative of capacitive properties. For example, a fall of impedance value of more than 50% between 50 Hz and 500 Hz, or between 100 Hz and 1000 Hz may be indicative of human properties. In example applications, frequencies of 50 Hz, 500 Hz and 2 kHz are used.

In addition to variation properties, the probing signal may also be used to determine whether an impedance of a human body is likely to be present. For example, the human resistance is about 500Ω to 1000Ω and detection of resistance or impedance in this range may attract particular attention for further check before power is supplied.

It should be appreciated that the disclosure and example herein is to facilitate better understanding and is not intended to be restrictive.

The invention claimed is:

1. A power safety device comprising a controller and power connection circuitry, the power connection circuitry defining a switchable power connection path between a source side and a load side;
   wherein the power connection circuitry is switchable by the controller to operate in a first operation state or an on-state in which state impedance between the source side and the load side is very low to permit flow of operation current through the power connection circuitry, or a second operation state or an off-state in which state impedance between the source side and the load side is very high to impede flow of operation current through the power connection circuitry;
   wherein the controller is to operate to transmit at least one type of probing signal to the load side when the power connection circuitry is in the off-state, and to evaluate and determine whether a response signal or a plurality of response signals from the load side contains at least one of a plurality of human characteristic responses indicative of direct electrical contact of a human body or a living body on the load side; and
   wherein the controller is to operate to switch the power connection circuitry from the off-state to the on-state if the responsive signals are determined to containing no indication or no reasonable indication of direct human or animal body contact on the load side; and wherein the plurality of human characteristic responses includes the following variable electrical characteristics: frequency variable or frequency dependent resistance, voltage variable or voltage dependent capacitance, time variable or time dependent resistance and impedance, time variable or time dependent capacitance, time variable or time dependent current density.

2. The power safety device according to claim 1, wherein the human characteristic responses include at least one of the following variable electrical characteristics:
   a more rapid rate of decrease of resistance and/or impedance with increasing probing voltages at lower probing voltages than higher probing voltages,
   a more rapid rate of decrease of impedance with increasing probing frequencies at lower probing frequencies than higher probing frequencies,
   asymptotic impedance for probing frequencies above 2 kHz to 5 kHz or below 25 Hz,
   a more rapid rate of decrease of impedance with increasing probing frequencies at lower probing voltages than higher probing voltages, and
   a more rapid rate of decrease of impedance in the initial 10 seconds than after the first 10 seconds.

3. The power safety device according to claim 1, wherein the power safety device comprises a probe signal source which is operable by the controller to transmit at least one type of probing signal to the load side, and a load monitor which is to monitor a plurality of responsive signals on the load side, the responsive signals including, for example, responsive voltages and responsive currents at different times, and the controller is to operate the probe signal source to transmit the probing signal to the load side when the power connection path is in the high impedance state and to collect and evaluate responsive signals through the load monitor, the responsive signal being a signal generated on the load side in response to the probing signal.

4. The power safety device according to claim 1, wherein the power connection path comprises a first current conduction path on the source side, a second current conduction path on load side, and the power switching device connects the first current conduction path with the second current conduction path; wherein the power switching device is operable in a very high impedance off-state to impede flow of operation current between the first and second current conduction paths and a very low impedance on-state to permit flow of operation current between the first and second current conduction paths; and wherein the power switching device is set initially in the off-state and to be set into the on-state if the outcome of determination of the controller is that the responsive signal contains no information indicating direct bodily contact of a human body or a living body.

5. The power safety device according to claim 1, wherein the power switching device is set to remain in the off-state if the responsive signal contains information indicating direct bodily contact of a human body or a living body.

6. The power safety device according to claim 1, wherein the probe signal source is set to transmit a probing signal to the load side, the probing signal comprising a plurality of probing signal cycles and each probing cycle comprising a signalling period followed by a non-signalling period; and/or wherein each signalling period has a duration of 20 ms or less, 15 ms or less, 10 ms or less, or 5 ms or less.

7. The power safety device according to claim 1, wherein the switching circuitry comprises a probe signal switching device, and the probe signal source is connected to the load side via the probe signal switching device; and
wherein the probe signal switching device is operable by the controller to control transmission of probe signals to the load side; and/or
wherein the controller is to set the power switching device in the off-state to impede operational current flow and the probe signal switching device oppositely in the on-state on each power up or on reset to permit flow of probing signals to the load side.

8. The power safety device according to claim 1, wherein the probe signal source is operable to generate probing signals of non-constant or variable amplitude and/or non-constant or variable frequency.

9. The power safety device according to claim 1, wherein the probing signal has a frequency of between 20 Hz and 20 kHz, including 20 Hz or 25 Hz to 1000 Hz, 1.5 kHz, 2 kHz, 2.5 kHz, 3 kHz, 5 kHz, 10 kHz, 15 kHz and 20 kHz.

10. The power safety device according to claim 1, wherein the probing signal comprises a plurality of signals, the signals having a first frequency of between 10 Hz and 100 Hz, between 20 Hz and 80 Hz, or between 50 Hz and 100 Hz;
a second frequency of between 101 Hz and 1000 Hz, between 101 Hz and 500 Hz, or between 501 and 1000 Hz, and
a third signal frequency of between 1001 Hz and 2000 Hz, between 1001 Hz and 1500 Hz, between 1501 Hz and 2000 Hz, or higher than 2000 Hz.

11. The power safety device according to claim 1, wherein the probing signal has a sinusoidal waveform, a square or rectangular wave form, or a saw tooth waveform.

12. The power safety device according to claim 1, wherein the probing signal has a probing voltage of between 8V and 50V.

13. The power safety device according to claim 1, wherein the controller is set to determine whether the load side is in an undesirable state of open circuit state, a short circuit state, and/or an unexpected impedance state and the controller is set to not to switch the power switching device into the on-state when the undesirable state is detected.

14. The power safety device according to claim 1, wherein the probing signal is a direct current signal in the form of a train of square pulses.

15. The power safety device according to claim 1, wherein the probing signal comprises signals in the form of a train of square waves, the square waves having a repetition frequency of up to 2 kHz and a peak amplitude of between 10V and 36V.

16. A power safety device comprising a controller and power connection circuitry, the power connection circuitry defining a switchable power connection path between a source side and a load side;
wherein the power connection circuitry is switchable by the controller to operate in a first operation state or an on-state in which state impedance between the source side and the load side is very low to permit flow of operation current through the power connection circuitry, or a second operation state or an off-state in which state impedance between the source side and the load side is very high to impede flow of operation current through the power connection circuitry;
wherein the controller is to operate to transmit at least one type of probing signal to the load side when the power connection circuitry is in the off-state, and to evaluate and determine whether a response signal or a plurality of response signals from the load side contains at least one of a plurality of human characteristic responses indicative of direct electrical contact of a human body or a living body on the load side; and wherein the controller is to operate to switch the power connection circuitry from the off-state to the on-state if the responsive signals are determined to containing no indication or no reasonable indication of direct human or animal body contact on the load side;
wherein the human characteristic responses include at least one of the following variable electrical characteristics:
a significant or substantial decrease of resistance with an increase in probing voltage in at least a range of probing voltages, a significant or substantial decrease of impedance with an increase in probing voltage in at least a range of probing voltages,
a significant or substantial decrease of resistance with an increase in probing frequency in at least a range of probing frequencies, a significant or substantial decrease of impedance with an increase in probing frequency in at least a range of probing frequencies, and
a significant or substantial decrease of current or current density with increase in probing time.

17. The power safety device according to claim 16, wherein the range of probing voltages is between 10 volt and 200 volt, including 10 volt and 50 volt, and 10 volt and 100 volt, direct current voltage or root-mean square alternating current voltage, the probing frequency is between 25 Hz to 30 kHz, including 20 Hz or 25 Hz to 100 Hz, 150 Hz, or 20 kHz and 20 Hz or 25 Hz to 2 kHz, and the range of probing time is from 10 ms to 40 seconds, including 100 ms to 10 second.

18. A power safety operation method for operating a power switching device, the power switching device comprising a switchable device which is operable by a controller to switch a power path between load side and a source side between a conductive state and a non-conductive state, the method comprising:
transmitting a probing signal to a load side before switching the switchable device to a conductive state, wherein the probing signal comprises signals comprising a plurality of frequencies and/or a plurality of voltages;

monitoring and collecting a responsive signal to the probing signal at the load side, evaluating the responsive signal and determining whether the responsive signal carries characteristic variable electrical properties of a living body including a human body, switching the power path to the conductive state only if the responsive signal carries no characteristic variable electrical properties of a living body including a human body.

19. The power safety operation method according to claim 18, wherein the probing signal comprises signals in the form of a train of square waves.

20. The power safety operation method according to claim 18, wherein the probing signal comprises signals having a frequency of up to 2 kHz and a peak amplitude of between 10V and 36V.

* * * * *